United States Patent [19]

Himi

[11] 3,845,458
[45] Oct. 29, 1974

[54] BUS-BAR CONNECTION APPARATUS FOR AN ELECTRICAL MACHINERY OF METAL CLAD TYPE

[75] Inventor: Hitoshi Himi, Tokyo, Japan

[73] Assignee: Kabushiki Kaisha Meidensha, Tokyo, Japan

[22] Filed: Aug. 20, 1973

[21] Appl. No.: 389,789

[30] Foreign Application Priority Data
Aug. 22, 1972 Japan............................... 47-83996

[52] U.S. Cl. ......... 339/117 R, 174/21 JS, 174/71 R
[51] Int. Cl. .................... H01r 3/02, H02g 5/00
[58] Field of Search ..... 174/12 R, 12 BH, 18, 21 R, 174/21 JS, 21 C, 22 R, 71 R, 71 B, 73 R; 339/94 R, 94 A, 94 C, 115 R, 116 R, 116 C, 117 R, 177 R

[56] References Cited
UNITED STATES PATENTS
| | | |
|---|---|---|
| 1,988,279 | 1/1935 | Kirch ............................... 174/22 R |
| 2,967,899 | 1/1961 | Priaroggia ......................... 174/22 R |
| 3,155,787 | 11/1964 | Imhof ........................... 174/21 R UX |
| 3,509,518 | 4/1970 | Phillips ......................... 174/73 R UX |
| 3,622,940 | 11/1971 | Illies ............................... 174/18 UX |

Primary Examiner—Laramie E. Askin
Attorney, Agent, or Firm—Hans Berman

[57] ABSTRACT

Respective bare end portions of two or more bus bars are joined mechanically and electrically by a connector of conductive material. A casing spacedly encloses the connector, the bare end portions of the bus bars, and adjacent portions of the bus bars which are enveloped by tubular members of insulating material. The tubular members are fastened to the casing whose interior is hermetically sealed and filled with insulating fluid injected into the casing through longitudinal passageways in the bus bars.

9 Claims, 3 Drawing Figures

BUS-BAR CONNECTION APPARATUS FOR AN ELECTRICAL MACHINERY OF METAL CLAD TYPE

This invention relates to bus bars, and particularly to a bus bar connecting arrangement for electrical machinery, such as switching devices and transformers.

In known switching apparatus designed for a nominal voltage of more than 60 KV, gaseous insulating materials, such as sulfur hexafluoride, have been employed. For the necessary dielectric strength, the gas must be maintained at high pressures, and the gas pressure must be monitored periodically for detection of leakage and replenishment of gas lost. Solid insulating materials are free of this shortcoming, but the necessary heavy layers of solid material tend to crack due to the different rates of thermal expansion of the insulating material and of the metallic conductors embedded therein, and corona discharge and current leaks occur at the cracks. For this reason, solid insulating materials have been used only in electric machinery operating at maximum nominal voltages of 20 to 30 KV.

A principal object of this invention is the provision of a bus bar connection arrangement which avoids the shortcomings of the afore-described arrangements.

In its more specific aspects, the invention provides a bus bar connecting arrangement in which elongated tubular members of solid insulating material envelop a first and a second bus bar, leaving a longitudinally terminal part of each bus bar bare. One of the bus bars is formed with a longitudinal passageway extending therethrough and terminating in an opening in the bare part. A connector of electrically conductive material connects the bare parts of the first and second bus bars. A casing has an inner face which defines a central cavity in the casing and two passages leading from the cavity toward respective open ends of the passages. The connector is positioned in the cavity and spaced from the inner face, and respective portions of the bus bars enveloped by the tubular members extend inward of the casing through the open ends, the tubular members being spaced transversely from the inner face of the casing in the respective passages. Each tubular member is fastened to the casing outside the cavity and the passages which are hermetically sealed. An insulating fluid in the cavity and in the passages separates the inner face from the tubular members, the bare parts of the bus bars, and the connector.

Other features, additional objects, and the attendant advantages of this invention will become apparent from the following description of preferred embodiments referring to the accompanying drawing in which:

FIG. 3 shows a modification of the arrangement of FIG. 1 in a fragmentary corresponding view.

Figure 1:
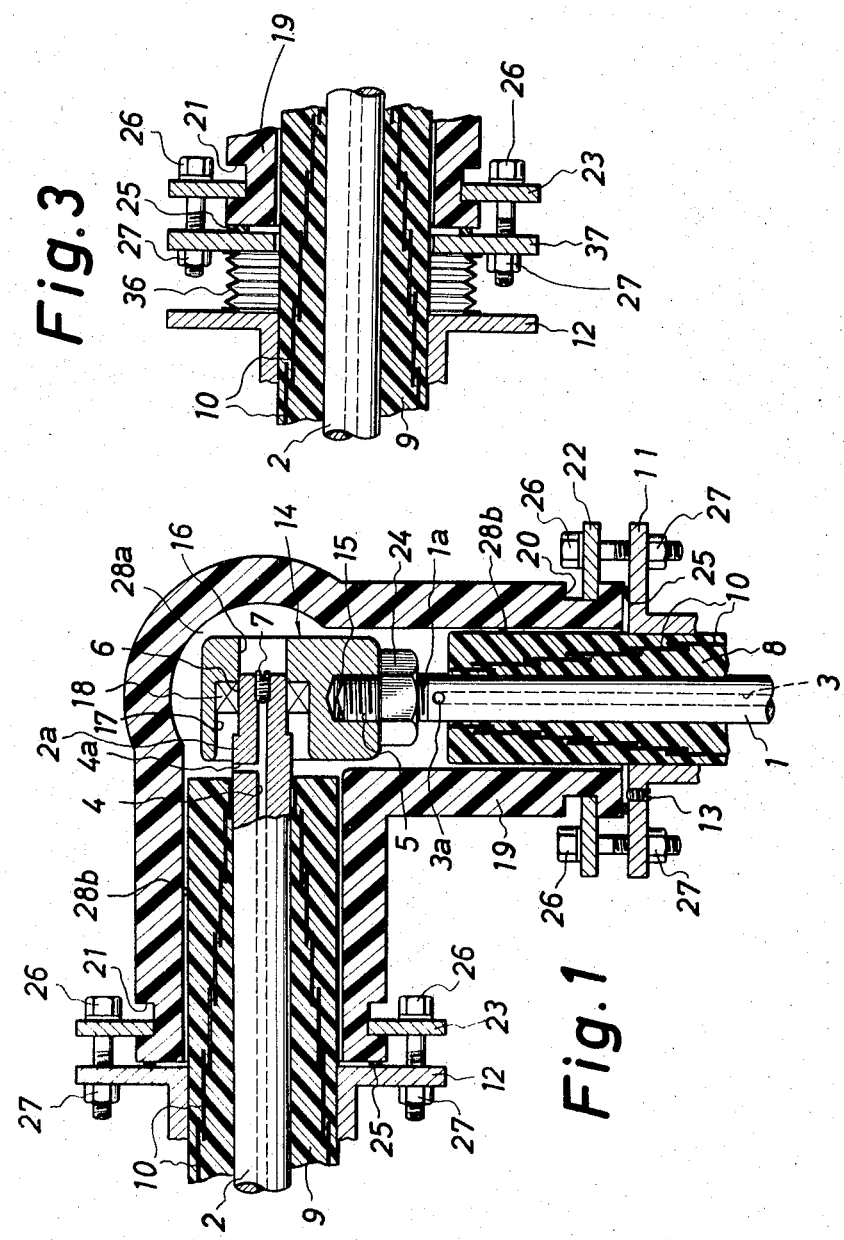
FIG. 1 shows a bus bar connecting arrangement of the invention in elevational section.

Referring initially to FIG. 1, there are shown two cylindrical bus bars 1, 2 formed with respective axial bores 3, 4. Radial openings 3a, 4a lead from the bores 3, 4 to the bare axial surfaces of respective end portions 1a, 2a of the bars. The bare end portion 1a carries coaxial, external threads 5. The terminal part 6 of the bare portion 2a is of reduced diameter. An axial opening of the bore 4 in the terminal part 6 is closed by a threaded plug 7.

The longitudinal portions of the bus bars 1, 2 adjacent the bare end portions 1a, 2a are enveloped by molded-on tubular members 8, 9 of insulating material of uniform diameter. A conical layer 10 of conductive condenser material is embedded in each tubular member 8, 9 and tapers toward the bare end 1a, 2a. Flanges 11, 12 are fixedly fastened to the tubular members 8, 9 in fluid-tight relationship. A vent opening in the flange 11 is sealed by a threaded plug 13.

The bare ends 1a, 2a of the bus bars are linked by a metallic connector 14 having a threaded blind bore 15 in which the threads 5 of the bus bar 1 are matingly received and secured by a locking nut 24. Another bore extending through the connector 14 at right angles to the axis of the bore 15 has a portion 16 of smaller diameter and a portion 17 of larger diameter. The bare end 2a of the bus bar 2 passes through the bore portion 17 into the bore portion 16 which conformingly receives a portion of the terminal part 6. A conductive contact ring 18 is interposed between the terminal part 6 and the connector 14 in the bore portion 17.

The bus bars 1, 2, the tubular members 8, 9, and the connector 14 are enclosed in an oversized, approximately L-shaped casing 19 of insulating material. The connector 14 is received in a central cavity in the bight portion of the casing, while the bus bars 1, 2, enveloped by the tubular members 8, 9, extend inward of the casing through the open ends of the leg parts of the L-shape. Annular grooves 20, 21 in the casing 19 near the open ends retain loose flanges 22, 23 respectively. Sealing rings 25 are interposed between the end faces of the casing 19 about the open ends and the flanges 11, 12 fixed on the tubular members 8, 9, and the open ends of the casing are sealed by bolts 26 and nuts 27 drawing the pairs of loose and fixed flanges toward each other.

In assembling the apparatus shown in FIG. 1, the bus bar 1 partly enveloped in the tubular body 8 is attached to the connector 14 carrying the contact ring 18 by means of the threads 5 and secured by means of the nut 25. The bus bar 1 carrying the connector 14 is then inserted into the casing 19 through one open end. The bus bar 2 is inserted through the other open end until the reduced terminal part 6 spreads the contact ring 18 in the bore portion 17 of the connector 14 and is thereby fastened to the connector 14. The sealing rings 25 are placed between the end faces of the casing 19 and the flanges 11, 12, and the flanges 11, 22 and 12, 23 are moved toward each other by means of the bolts 26 and nuts 27. The bus bars 1, 2 are thereby firmly secured to the connector 14 and to each other.

The inner face of the casing 19 is separated from the connector 14 and the bare ends 1a, 2a by a space 28a in the central cavity of the casing, and from the tubular members 8, 9 by annular spaces 28b in the two leg portions of the casing 19. Sources of insulating fluid, such as oil, dry air, nitrogen, or sulfur hexafluoride, are connected to the non-illustrated portions of the bores 3, 4, and the fluid is injected into the casing 19 until it fills every portion of the spaces 28a, 28b. Air and moisture are purged from the casing 19 through the vent opening in the flange 11 from which the plug 13 is temporarily removed. When the plug 13 is replaced, the interior of the casing 19 is hermetically sealed.

Because the end parts 1a, 2a of the bus bars are not covered with heavy solid insulating material, but are insulated from the casing 19 by the liquid or gaseous fluid, no cracks are formed in solid insulation due to differential thermal expansion as the temperature of the connecting arrangement rises. The temperature increase in portions of the bus bars 1, 2 remote from the connector 14 is small and, because of the uniform shape of the bus bars, no cracks tend to form in the tubular bodies 8, 9 of solid insulating material. Because the tubular bodies are further enveloped by fluid insulating material in the annular spaces 28b, the diameters of the bodies 8, 9 need not be maintained accurately uniform. Gas does not tend to leak from the spaces 28a, 28b.

The bus bar connection arrangement shown in FIG. 2 links three bus bars in a T-pattern, the stem of the T being formed by a bus bar identical with the bus bar 1 described with reference to FIG. 1 and carrying a tubular insulator body 8, and the arms of the T being constituted by bus bars which are each identical with the afore-described bus bar 2 and carrying tubular insulators 9. Corresponding parts of the bus bars 1, 2 have been provided with the same reference numerals in FIG. 2 as in FIG. 1 and will not again be described.

The three bus bars are linked by a metallic connector 29 whose internally threaded, blind bore 30 receives the threads 5 of the bus bar 1. A through-bore 31 of the connector 29 holds two contact rings 32, 33 in which the respective bare ends 2a of the two bus bars 2 are received. An oversized, T-shaped casing 34 holds the connector 29 in a central cavity 35a from which three passages 35b lead to respective open ends of the casing. These ends are normally sealed by flanges in the same manner as described with reference to FIG. 1, and the cavity 35a as well as the communicating passages 35b are filled with fluid insulating material.

Figure 2:
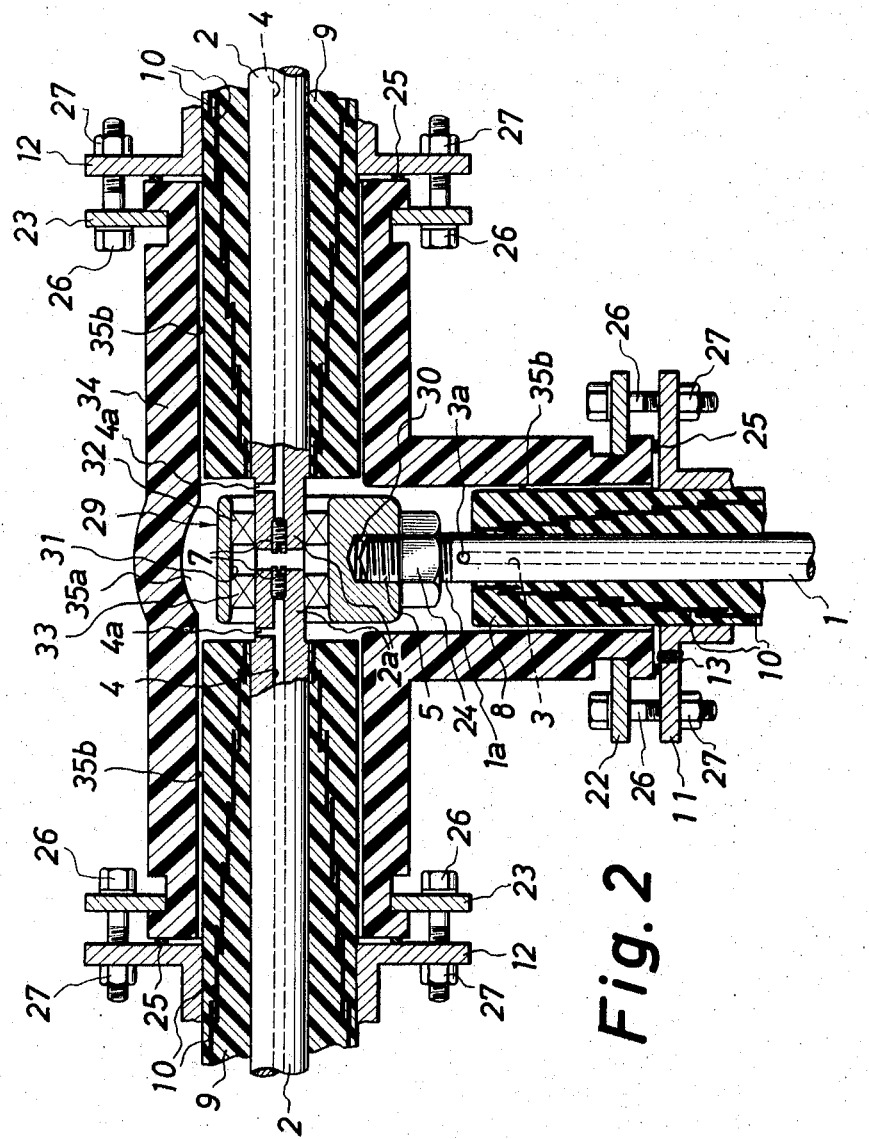
FIG. 2 illustrates another embodiment of the invention in elevational section.

Connection arrangements having bus bars arranged differently than shown in FIGS. 1 and 2 may readily be built in an analogous manner.

FIG. 3 shows a modified flange connection for the devices of FIG. 1 or FIG. 2 which permits the bare end of a bus bar 2 to be shifted relative to the associated connector 14 or 29. The bus bar 2 shown in FIG. 3 carries a flange 12 fixedly fastened to the associated tubular body 9 of insulating material. The loose flange 23 retained in an annular groove of the associated casing 19 is fastened by bolts 26 and nuts 27 to another loose flange 37 which clamps the sealing ring 25 to the end face of the casing 19. A bellows 36 connects the flanges 37, 12, thereby permitting longitudinal movement of the bus bar 2 relative to the casing 19.

While casings 19, 34 of insulating material have been illustrated and described, metallic casings may be employed if sufficiently separated from current-carrying elements by fluid insulating material. If so desired, the metallic connectors 14, 29 may be covered with a thin solid film of solid insulating material.

What is claimed is:
1. A bus bar connecting arrangement comprising:
   a. a first bus bar;
   b. a second bus bar;
   c. an elongated, tubular member of solid insulating material enveloping each bus bar, but leaving a longitudinally terminal part of said bus bar bare,
      1. one of said bus bars being formed with a longitudinal passageway extending therethrough and terminating in an opening in said bare part;
   d. a connector of electrically conductive material connecting said bare parts of said first and second bus bars;
   e. a casing having an inner face defining a central cavity and two passages leading from said cavity toward respective open ends of said passages,
      1. said connector being positioned in said cavity and spaced from said inner face,
      2. respective portions of said bus bars enveloped by said tubular members extending inward of said casing through said open ends, said tubular members being spaced transversely from said inner face in the respective passages;
   f. fastening means for fastening each of said tubular members to said casing outside said cavity and said passages;
   g. sealing means hermetically sealing said cavity and said passages; and
   h. an insulating fluid in said cavity and said passages separating said inner face from said tubular members, said bare parts, and said connector.

2. An arrangement as set forth in claim 1, wherein said connector and the bare part of said first bus bar carry respective matingly engaged threads.

3. An arrangement as set forth in claim 1, further comprising an annular conductive member releasably mounted on said connector, said bare part of said second bus bar being received in said conductive member.

4. An arrangement as set forth in claim 1, wherein said fastening means for fastening one of said tubular members to said casing include respective flanges secured to said one tubular member and to said casing, and connecting means connecting said flanges for relative movement.

5. An arrangement as set forth in claim 4, wherein said connecting means include bellows.

6. An arrangement as set forth in claim 1, further comprising a normally plugged vent for venting said cavity to the ambient atmosphere.

7. An arrangement as set forth in claim 1, wherein said casing is constructed of electrically conductive material.

8. An arrangement as set forth in claim 7, wherein said connector is covered with a thin surface layer of solid insulating material.

9. An arrangement as set forth in claim 1, further comprising condenser layers embedded in the insulating material of each of said tubular members and extending over substantially the entire length of each tubular member from said open end to said bare terminal part.

* * * * *